United States Patent
Hachiro et al.

(10) Patent No.: US 7,471,412 B2
(45) Date of Patent: Dec. 30, 2008

(54) IMAGE PRINTING APPARATUS AND METHOD OF CONTROLLING THE SAME

(75) Inventors: Shigeki Hachiro, Yokohama (JP); Kazuya Imafuku, Kawasaki (JP); Naomi Nakamura, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 202 days.

(21) Appl. No.: 11/500,882

(22) Filed: Aug. 9, 2006

(65) Prior Publication Data
US 2007/0035760 A1 Feb. 15, 2007

(30) Foreign Application Priority Data
Aug. 10, 2005 (JP) .............................. 2005-232300

(51) Int. Cl.
*G06F 3/12* (2006.01)
*H04N 1/00* (2006.01)

(52) U.S. Cl. .................. 358/1.15; 358/474; 358/1.6; 358/1.5; 358/1.13

(58) Field of Classification Search ............... 358/1.1, 358/1.2, 1.6, 1.8, 1.9, 1.11, 1.12, 1.13, 1.14, 358/1.15, 1.16, 1.17, 1.18, 474, 502, 505, 358/506, 475, 486, 487, 488, 489, 491, 493, 358/494, 496, 497, 498, 1.3, 1.4, 1.5, 1.7; 715/274; 382/312, 315, 317, 318, 319, 324; 347/1, 2, 3, 5, 14, 23, 12, 13, 42, 46, 129; 399/1, 7, 2, 363, 365, 376
See application file for complete search history.

(56) References Cited

U.S. PATENT DOCUMENTS

| 7,059,785 | B2 | 6/2006 | Kato et al. ..................... 400/62 |
| 2003/0053096 | A1 | 3/2003 | Nagata ........................ 358/1.9 |
| 2004/0239959 | A1* | 12/2004 | Yada et al. ................... 358/1.2 |
| 2005/0244205 | A1 | 11/2005 | Kato et al. ..................... 400/62 |

FOREIGN PATENT DOCUMENTS

| JP | 2003-177898 | 6/2003 |
| JP | 2004/297781 | 10/2004 |

* cited by examiner

*Primary Examiner*—Dov Popovici
(74) *Attorney, Agent, or Firm*—Fitzpatrick, Cella, Harper & Scinto.

(57) ABSTRACT

This invention provides an apparatus and a method capable of improving the throughput, reducing the apparatus cost, and executing marginless copy with a natural impression. According to this invention, a multi-function printer executes marginless copy in the following. Marginless copy and a printing paper size are instructed. The position and size of an original placed on the original table of the scanner are detected. A reading area on the original table is decided on the basis of the instruction, detection result, and a predefined extra-printing size. Control is done to execute image reading while limiting the operation range of the sensor of the scanner so that the image original is read from the decided reading area.

11 Claims, 9 Drawing Sheets

IMAGE PRINTING APPARATUS AND METHOD OF CONTROLLING THE SAME

BACKGROUND OF THE INVENTION

1. Field of the Invention

This invention relates to an image printing apparatus and a method of controlling the same. More particularly, this invention relates to an image printing apparatus which reads an image original and prints it by using a printhead of inkjet printing method and a control method applied to this apparatus.

2. Description of the Related Art

A so-called multi-function printer (MFP) having an image reading function in addition to a print function is recently widespread, replacing a so-called single-function printer (SFP) having only a print function.

In addition to the single-function printer's "print function" of printing print data generated by a host apparatus such as a personal computer, the multi-function printer has the following functions: a "direct print function" of printing image data stored in, e.g., a memory card without intervening a host apparatus such as a personal computer, an "image supply (scan) function" of supplying image data generated from a read original to, e.g., a personal computer, and a "copy function" of copying a read image without intervening a host apparatus such as a personal computer.

Of these functions, the copy function is unique to the multi-function printer since the function cannot be implemented by a single function apparatus such as a single-function printer or scanner. The copy function includes various copy modes to meet the needs of users.

The copy modes include, e.g., a "same-size copy" mode to copy an original of the same size (magnification rate: 100%) to a printing paper sheet and a "fixed rate magnification/reduction" mode to copy an original with a specific size (e.g., A4 original) to printing paper sheet of a specific size (e.g., B5 paper). There is also included an "automatic magnification/reduction" mode to automatically detect the size and position of an original, enlarge/reduce the image at an optimum magnification/reduction rate, and copy the image to a available printing paper sheet.

As is disclosed in Japanese Patent Publication Laid-Open No. 2004-297781, a "marginless copy" mode is also available in which an original is copied to a printing paper sheet without margin. The "automatic magnification/reduction" mode and "marginless copy" mode may be combined.

A multi-function printer having a film reading function has a "film copy" mode to copy an image read from a film to a printing paper sheet.

In the marginless copy mode, an image is enlarged at such a magnification rate that the vertical and horizontal sizes of the image original become equal to or larger than the vertical and horizontal sizes of a printing paper sheet, respectively. After the image original is enlarged, the extra portion over the printing paper size is cut off, thereby equalizing the size of the enlarged image to that of the printing paper sheet.

In marginless printing, an extra-printing area is set at each of the top, bottom, left, and right margins of a printing paper sheet, thereby making the printing area larger than the printing paper size, as disclosed in Japanese Patent Publication Laid-Open No. 2003-177898. Hence, even when the printing paper sheet is slightly off the position, a perfectly marginless printing result without margin can be obtained on the printing paper sheet.

FIG. 8 is a view showing the relationship between a printing paper sheet and a printing area.

As shown in FIG. 8, extra-printing areas (TM, BM, LM, and RM) are set at the top, bottom, left, and right margins with respect to a horizontal size (PW) and vertical size (PH) of a printing papery sheet A01. When printing is done in a printing area A02 having a horizontal size (APW) and vertical size (APH) larger than the printing paper sheet size, a perfectly marginless printing result can be obtained on the printing papery sheet A01.

In the above-described prior art, however, when marginless copy to fill the overall printing area with an image is executed by reading the entire original, an image unnecessary for printing is also read. This increases the time required for image reading and image processing and eventually lowers the throughput. Since the size of image data obtained by image reading is also large, the memory capacity necessary for temporarily holding the image data is also large. This leads to an increase of the apparatus production cost.

FIG. 9 is a view showing the relationship between a reading area, an original area, and the original table area of an MFP having a copy function.

Referring to FIG. 9, an original area A03 indicates the size of a read original. An original table area A04 is the area of a table to place an image original in the MFP. A reading area A05 is an area necessary for actual image printing in the MFP.

As is apparent from this relationship, an area corresponding to the original area A03 is read in marginless copy. An area necessary for printing is the smaller reading area A05. If the difference between the original area A03 and the reading area A05 becomes large, unwanted reading and image processing are executed.

IN_SizeX and IN_SizeY in FIG. 9 indicate the horizontal reading size and vertical reading size of the reading area A05. A reading reference position (R0) is set at the upper left corner of the original table area A04. The coordinate origin is set at this position, horizontal and vertical positions are defined, based on the coordinate origin. The coordinate values of the reading start position (RS) of the reading area A05 are (IN_OfsX, IN_OfsY). The horizontal and vertical sizes of the reading original are OH and OV, respectively. Upon reading an original, a CCD sensor or CIS sensor having a reading width corresponding to the width of the original table area A04 in the horizontal direction scans the original in the direction of an arrow A, thereby reading the image of the entire original.

In marginless copy, if the extra-printing areas of the printed image in view of the print medium are not uniform in the vertical or horizontal direction, the center of the original and that of the image on the printing paper sheet do not match. This produces an unnatural impression for the user.

SUMMARY OF THE INVENTION

Accordingly, the present invention is conceived as a response to the above-described disadvantages of the conventional art.

For example, an image printing apparatus and a method of controlling the apparatus according to the present invention is capable of improving a throughput, reducing the apparatus production cost, and performing a marginless copy with a natural impression.

According to one aspect of the present invention, preferably, there is provided an image printing apparatus which includes reading means for reading an image original by scanning a sensor, and printing means for printing on a print medium on the basis of image data of an image read by the reading means and is capable of copying the image, comprising: marginless copy instruction means for instructing marginless copy; size instruction means for instructing a size of the print medium; detection means for detecting a position and a size of an original placed on an original table of the reading means; first decision means for deciding a reading area on the original table on the basis of the instructions by the marginless copy instruction means and the size instruction means, a detection result by the detection means, and a predefined extra-printing size; and reading control means for controlling the reading means to execute image reading while limiting an operation range of the sensor so that the image of the image original is read from the reading area decided by the first decision means.

The apparatus preferably further comprises second decision means for deciding, in accordance with the instructions by the marginless copy instruction and the size instruction means, a size of the image to be printed by the printing means for printing on the print medium, and print control means for controlling the printing means to print the image having the size decided by the second decision means on the print medium on the basis of the image data of the image read under the control of the reading control means.

The marginless copy instructed by the marginless copy instruction means includes an automatic magnification/reduction copy mode.

When the automatic magnification/reduction copy is instructed, the detection means preferably automatically detects the position and the size of the original placed on the original table by operating the reading means and causing the sensor to scan at a resolution lower than that for actual image reading.

A magnification rate of the image read by the reading means is preferably automatically decided on the basis of the automatically detected position and size of the original, the instructed size of the print medium, and the predefined extra-printing size.

It should be noted that the predefined extra-printing size is set at each of the top, bottom, left, and right margins of the print medium. In a case where the value is not uniform at the top, bottom, left, and right margins of the print medium, a reading range of the image is preferably automatically offset to align a center of the image original to a center of the image to be printed on the print medium.

Hence, this apparatus preferably further comprises enlargement/reduction means for enlarging/reducing the image data of the image read by the reading means.

The reading control means preferably controls to move the sensor at a high speed to the reading area decided by the first decision means.

The printing means preferably prints on the print medium by an inkjet printhead.

According to another aspect of the present invention, preferably, there is provided a method of controlling an image printing apparatus which includes reading means for reading an image original by scanning a sensor, and printing means for printing on a print medium on the basis of image data of an image read by the reading means and is capable of copying the image, comprising steps of: instructing a marginless copy; instructing a size of the print medium; detecting a position and a size of an original placed on an original table of the reading means; deciding a reading area on the original table on the basis of the instructions at the steps of instructing, a detection result at the step of detecting, and a predefined extra-printing size; and controlling the reading means to execute image reading while limiting an operation range of the sensor so that the image of the image original is read from the reading area decided at the step of deciding.

The invention is particularly advantageous since an optimum reading area can be obtained upon printing an image in a printing area without forming a margin as in marginless copy, and the reading area can be limited to an area necessary for printing.

Hence, the read image data size is reduced, and the reading operation is speeded up. In addition, since the capacity of the memory to store the read image data can be reduced, the apparatus cost can be reduced.

Even when the predefined extra-printing sizes at the top, bottom, left, and right margins of the print medium are not uniform, the reading area is automatically offset, and the center of the image original can be aligned to the center of the image on the print medium. Hence, marginless copy with a natural impression for the user can be attained.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will now be described in detail in accordance with the accompanying drawings.

Constituent elements described in the following embodiments are merely illustrative, and the scope of the invention is not limited to them.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink (e.g., can solidify or insolubilize a coloring agent contained in ink applied to the print medium).

Furthermore, unless otherwise stated, the term "nozzle" generally means a set of a discharge orifice, a liquid channel connected to the orifice and an element to generate energy utilized for ink discharge.

<Description of Image Printing Apparatus (FIGS. 1 and 2)>

Figure 1A:
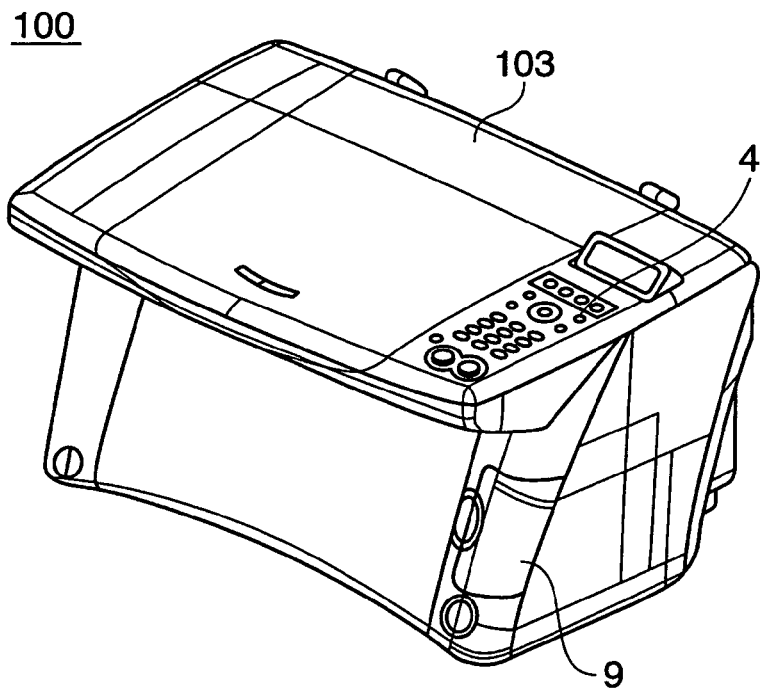
FIGS. 1A and 1B are perspective views showing the outer appearance of an image printing apparatus 100 according to a typical embodiment of the present invention.
Figure 1B:
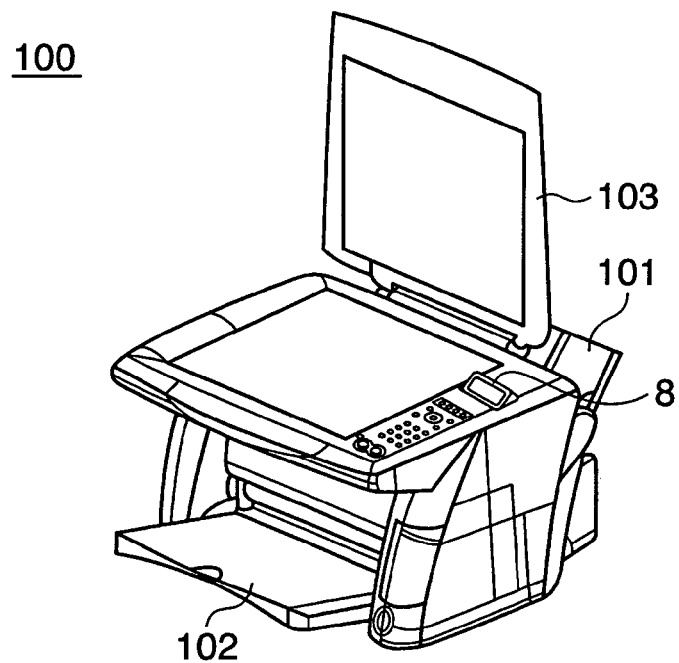

FIGS. 1A and 1B are perspective views showing the outer appearance of an image printing apparatus 100 according to a typical embodiment of the present invention.

The image printing apparatus can print an image on a print medium such as a printing paper sheet on the basis of image data from a connected host (not shown) and also execute printing based on image data stored in, e.g. a memory card and copy by reading an image original.

FIG. 1A shows a state where an original cover 103 is closed. FIG. 1B shows a state where a printing paper tray 101, original cover 103, and the original cover 103 are open.

A reading unit 8 having a CCD sensor reads an image original and outputs red (R), green (G), and blue (B) analog luminance signals. The reading unit 8 may use a contact image sensor (CIS) instead of the CCD. A card interface 9 is used to receive, e.g., a memory card in which image files obtained by a digital still camera (not shown) are stored and read out image data from the memory card in accordance with a predetermined operation of an operation unit 4.

Figure 2:
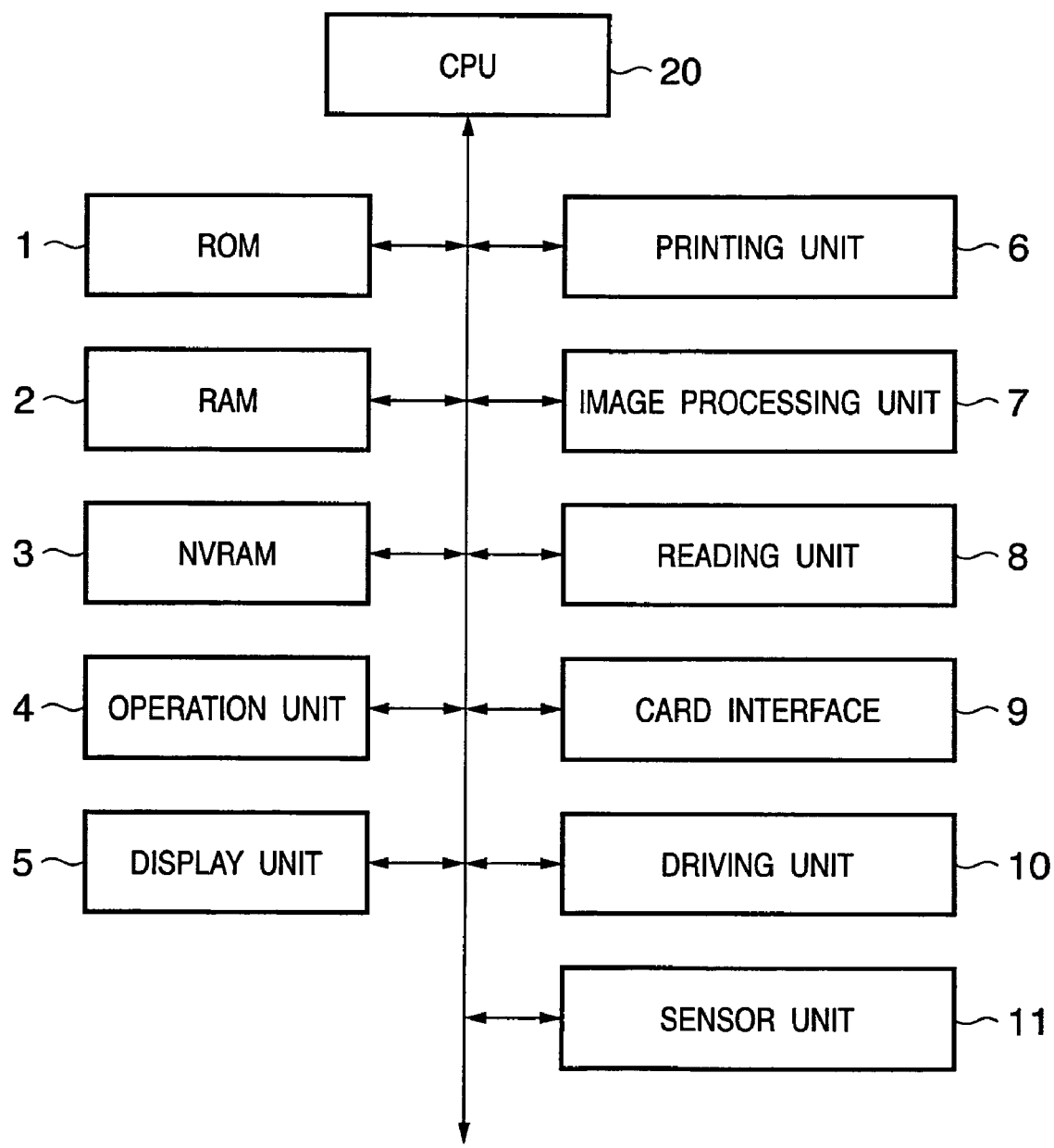
FIG. 2 is a block diagram showing the control configuration of the image printing apparatus 100.

FIG. 2 is a block diagram showing the control configuration of the image printing apparatus 100.

The image printing apparatus 100 comprises a ROM 1, RAM 2, nonvolatile RAM (NVRAM) 3, operation unit 4, display unit 5, printing unit 6, image processing unit 7, reading unit 8, card interface 9, driving unit 10, sensor unit 11, and CPU 20.

The CPU 20 controls various functions of the image printing apparatus 100 and executes various programs stored in the ROM 1 in accordance with a predetermined operation of the operation unit 4. The ROM 1 stores control programs and image processing programs to be executed by the CPU 20.

The image processing unit 7 executes image processing such as image analysis, thumbnail image generation, thumbnail correction, and output image correction. Image data obtained by these image processings is stored in the RAM 2. When image data stored in the RAM 2 reaches a predetermined amount necessary for printing by the printing unit 6, a print operation by the printing unit 6 is executed.

In the above-described image processing, different image data are generated in accordance with settings such as the printing paper sheet size, printing paper sheet type, ON/OFF of magnification/reduction printing, and ON/OFF of marginless printing.

The NVRAM 3 is an SRAM with battery backup or FeRAM, and stores data unique to the image printing apparatus 100. To select image data stored in the memory and start printing, the operation unit 4 comprises a photo-direct print start key, a monochrome/color copy start key, mode keys to set a copy resolution and an image quality, a stop key to stop, e.g., the copy operation, a ten-key pad to input the number of copies, and a registration key. The CPU 20 detects the press statuses of these keys and controls the units in accordance with the press statuses.

The display unit 5 comprises a dot-matrix LCD and an LCD driver and executes various kinds of display under the control of the CPU 20. The printing unit 6 includes an inkjet printhead and a general-purpose IC. The printing unit 6 reads out image data from the RAM 2 and prints the image under the control of the CPU 20.

The driving unit 10 includes a stepping motor and a DC motor to drive feed and discharge rollers, gears to transmit the driving force of the stepping motor and DC motor, and driver circuits to control the stepping motor and DC motor in the operations of the reading unit 8 and printing unit 6.

The sensor unit 11 includes a printing paper width sensor, printing paper presence/absence sensor, original width sensor, original presence/absence sensor, and print medium detection sensor. The CPU 20 detects the statuses of an original and printing paper sheet on the basis of information obtained from these sensors.

Figure 3:
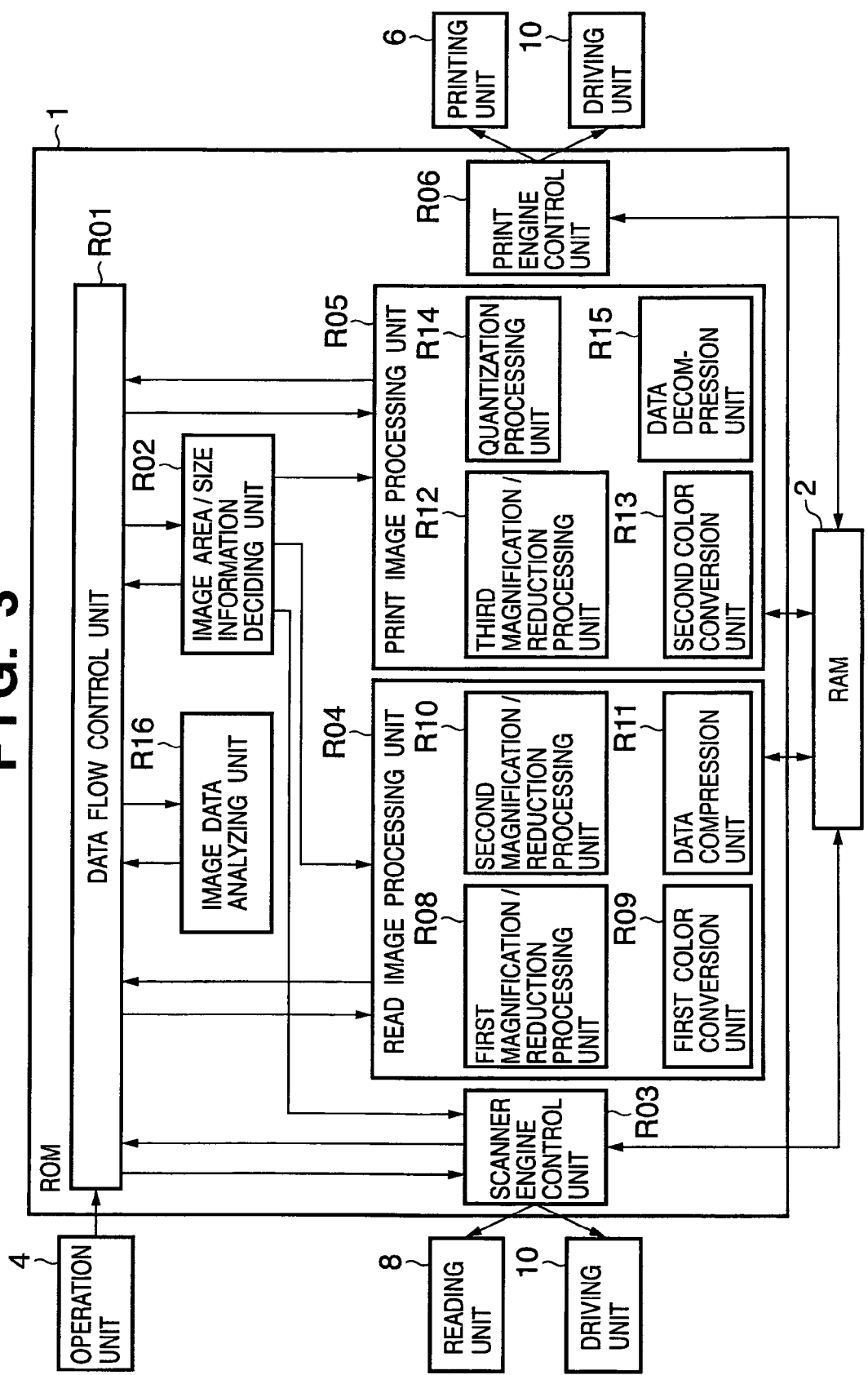
FIG. 3 is a block diagram showing the configuration of programs stored in a ROM 1.

FIG. 3 is a block diagram showing the configuration of programs stored in the ROM 1.

The programs stored in the ROM 1 are divided into a data flow control unit R01, image area/size information deciding unit R02, scanner engine control unit R03, read image processing unit R04, print image processing unit R05, and print engine control unit R06.

The read image processing unit R04 is divided into a first magnification/reduction processing unit R08, first color conversion unit R09, second magnification/reduction processing unit RIO, and data compression unit R11. The print image processing unit R05 is divided into a third magnification/reduction processing unit R12, second color conversion unit R13, quantization processing unit R14, and data decompression unit R15.

The data flow control unit R01 controls data transmission/reception to/from the image area/size information deciding unit R02, scanner engine control unit R03, and read image processing unit R04 on the basis of mode information and area information obtained by receiving a user instruction through the operation unit 4. The image area/size information deciding unit R02 decides the reading range and print range of an image original on the basis of mode information and the like received from the data flow control unit R01. The scanner engine control unit R03 reads image data with a range and size decided by the image area/size information deciding unit R02 by controlling the driving unit 10 and reading unit 8 and then transfers the image data to the read image processing unit R04 through the RAM 2. All the programs are loaded from the ROM 1 to the RAM 2 and executed. Hence, no information input/output is done between the ROM 1 and the RAM 2.

The scanner engine control unit R03 receives parameters such as a reading start position (RS in FIG. 9), reading sizes (IN_SizeX and IN_SizeY in FIG. 9), and reading resolution (IN_Reso) from the data flow control unit R01 and controls the driving unit 10 and reading unit 8.

The read image processing unit R04 executes image processing such as magnification/reduction and color conversion in accordance with the set mode, compresses the image data as needed, and saves the compressed data in the RAM 2.

The print image processing unit R05 decompresses image data received through the RAM 2 as needed, executes image processing such as magnification/reduction, color conversion, and quantization necessary for printing, and stores the processing result in the RAM 2.

The print engine control unit R06 controls the printing unit 6 and driving unit 10 to print an image represented by image data stored in the RAM 2 in, e.g., an area on a print medium such as a printing paper sheet decided by the image area/size information deciding unit R02.

The first, second, and third magnification/reduction processing units R08, R10, and R12 set parameters such as a magnification/reduction ratio and enlarge or reduce image data. The first and second color conversion units R09 and R13 set color processing parameters and execute color conversion processing by matrix operation and lookup table reference. The data compression unit R11 compresses image data by JPEG scheme. The data decompression unit R15 decompresses the image data compress-encoded by JPEG scheme. The quantization processing unit R14 quantizes image data into binary data by, e.g., error diffusion.

The image processing units R08 to R15 included in the read image processing unit R04 and print image processing unit R05 may only set image processing parameters and control the image processing unit 7. Actual image processing may be executed by the image processing unit 7 integrating hardware.

In this embodiment, it is assumed that the reading resolution of the reading unit 8 is 600 or 75 dpi. The print resolution of the printing unit 6 is 600 dpi.

Various kinds of image original copy processing using the image printing apparatus having the above configuration will be described next with reference to flowcharts.

1. Marginless and Normal Copy

In the example to be described below, an A4 image original is copied to an A4 printing paper sheet (297 mm (vertical)× 210 mm (horizontal)). The normal copy mode assumes that an edge of an image original having the same size as the printing paper sheet abuts against the reading reference position (R0 in FIG. 9). This operation is a counterpart to an automatic magnification/reduction mode (to be described later). In this embodiment, an extra-printing size at top margin (TM) is 5 mm, an extra-printing size at bottom margin (BM) is 5 mm, an extra-printing size at left margin (LM) is 5 mm, and an extra-printing size at right margin (RM) is 5 mm. These extra-printing sizes are stored in a printing paper size/printing area size database (DB).

Figure 4:
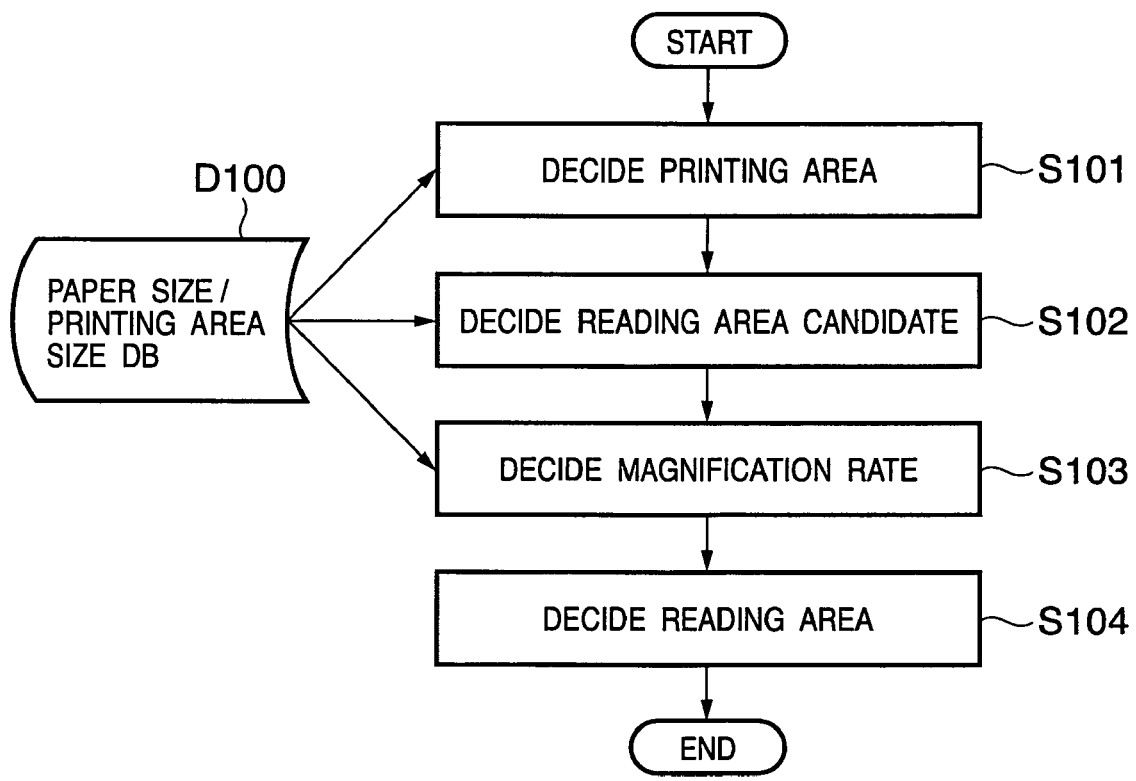
FIG. 4 is a flowchart showing details of processing in an image area/size information deciding unit R02.

FIG. 4 is a flowchart showing the internal processing of the image area/size information deciding unit R02.

First, in step S101, the size of the printing area and the size of the printing paper sheet are acquired from a printing paper size/printing area size database (DB) D100.

More specifically, the user inputs, through the operation unit 4, an instruction representing that the printing paper size is A4, and the mode is the marginless copy mode. The data flow control unit R01 receives the instruction information from the user, analyzes the information, and notifies the image area/size information deciding unit R02 that the operation mode is the marginless copy mode, and the printing paper size is A4.

The image area/size information deciding unit R02 acquires the vertical and horizontal pixel counts of the designated printing paper sheet and the vertical and horizontal pixel counts of the printing area from the printing paper size/printing area size DB and decides the printing area. If the print resolution is 600 dpi, and the paper size is A4, the vertical pixel count is 7,015 pixels, and the horizontal pixel count is 4,960 pixels. In this case, the printing area has a size obtained by extending the A4 size by 118 pixels to the upper, lower, left, and right sides.

Hence, the printing area size obtained in step S101 is 7,251 pixels (vertical)×5,196 pixels (horizontal). This data is written in the printing paper size/printing area size database (DB) D100. The above-described extra-printing sizes have been written in the printing paper size/printing area size DB in advance.

In step S102, an image original reading area candidate is decided on the basis of the mode information and the information of printing paper sheet and printing area. Details of this processing will be described below with reference to FIG. 5.

Figure 5:
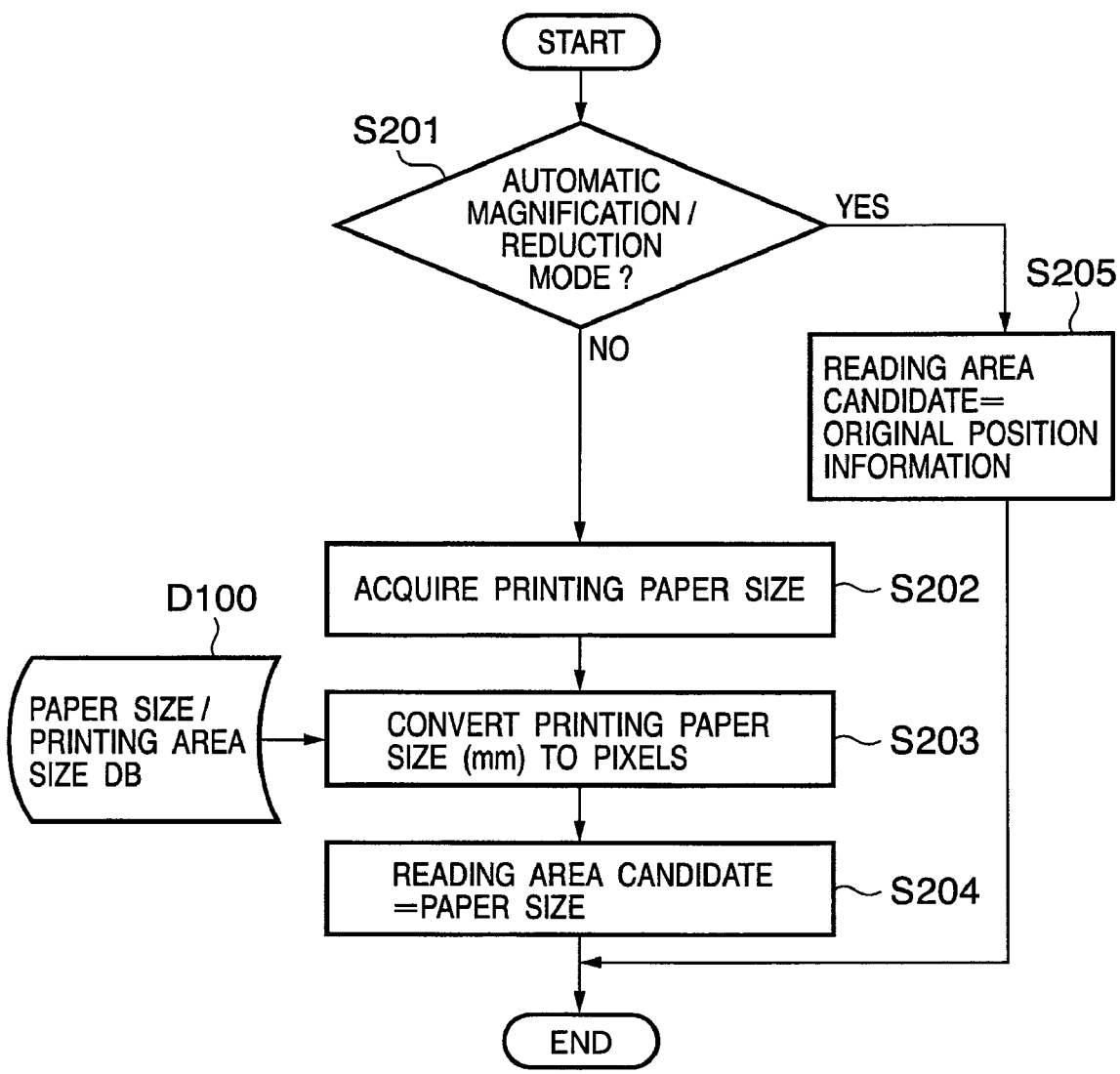
FIG. 5 is a flowchart showing details of reading area candidate decision processing.

FIG. 5 is a flowchart showing details of reading area candidate decision processing.

In step S201, it is checked whether the copy mode is the normal mode or automatic magnification/reduction mode. Since the copy processing currently considered is the normal mode, the processing advances to step S202.

In steps S202 and S203, the printing paper size is acquired and converted into pixel values. In step S204, the obtained pixel values are set to the reading start position RS (IN_OfsX, IN_OfsY) and the horizontal reading size (IN_SizeX) and vertical reading size (IN_SizeY) of the reading area as a reading area candidate. Assume that the pixel values are IN_SizeX=4960 and IN_SizeY=7015. The distance from the reading reference position (R0) to the reading start position (RS) is set to "0"s in both the vertical and horizontal directions. That is, RS(0, 0) is set.

In step S103, the magnification rate of the image original is decided on the basis of the mode information, the relationship between the reading area and the printing area, and a magnification rate designated by the user. Details of this processing will be described below with reference to FIG. 6.

Figure 6:
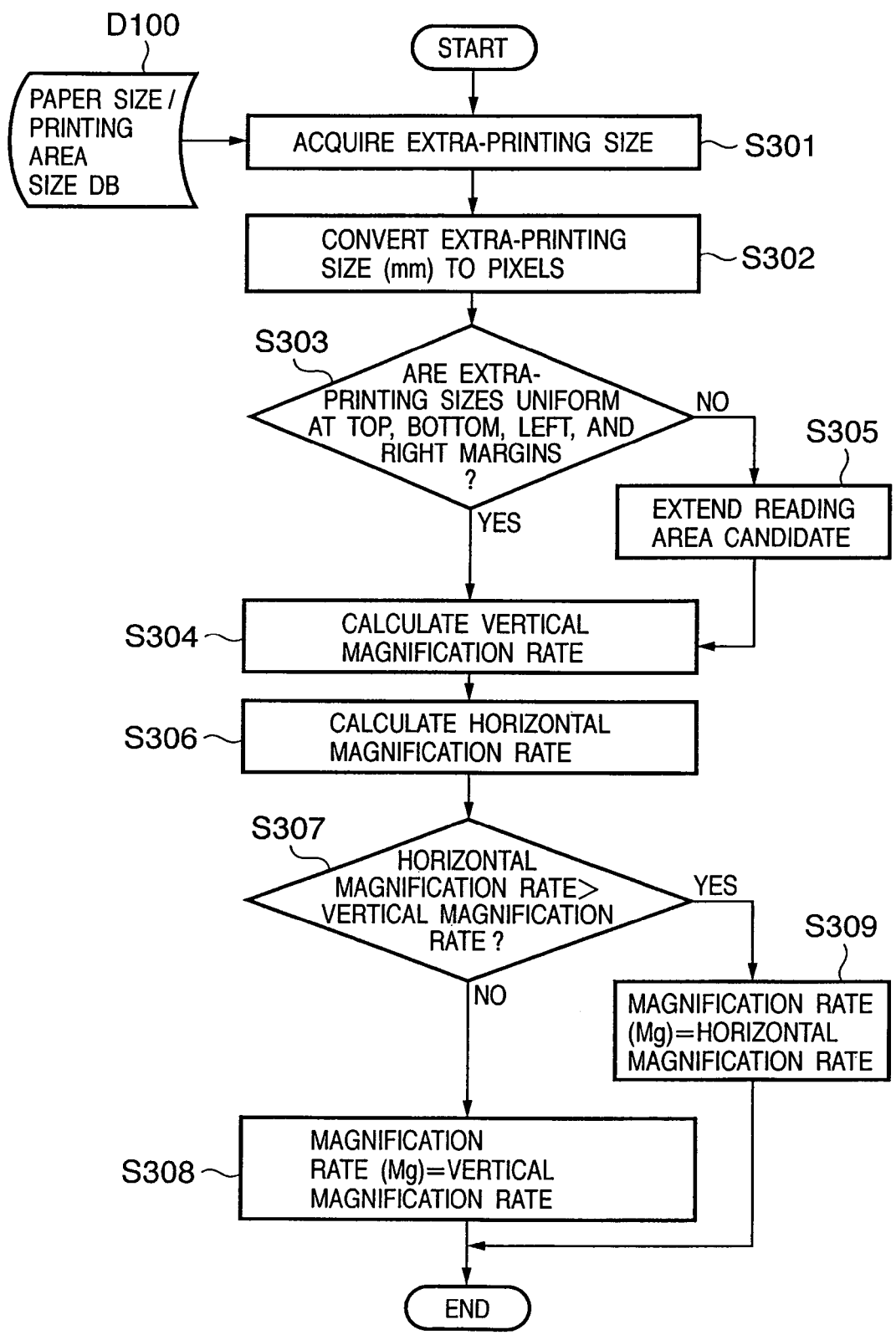
FIG. 6 is a flowchart showing details of magnification rate decision processing.

FIG. 6 is a flowchart showing details of magnification rate decision processing.

In this case, a magnification rate is obtained such that the image data having a size of IN_SizeX=4960 and IN_SizeY=7015 can be printed in a printing area having a size of 5,196 pixels (horizontal)×7,251 pixels (vertical) without forming any margin. As described above, the extra-printing sizes are uniformly 5 mm at the top, bottom, left, and right margins.

First, in step S301, the extra-printing size designated by the user is acquired from the printing paper size/printing area size DB. In step S302, the extra-printing size is converted into pixels. As described above, the extra-printing sizes are uniformly 5 mm at the top, bottom, left, and right margins. Since a decision in step S303 is "YES", the processing advances to step S304.

In step S304, a magnification rate (VMg) based on the vertical direction is obtained. In this case, the magnification rate is obtained by dividing the vertical printing area size by the vertical size of the image data. Hence, VMg=7251/7015=about 103.3%.

Similarly, in step S306, a magnification rate (HMg) based on the horizontal direction is obtained. In this case, HMg=5196/4960=about 104.7%.

To enlarge the image without forming any margin in the printing area, a larger magnification rate is employed. In step S307, the horizontal magnification rate (HMg) is compared with the vertical magnification rate (VMg). If HMg>VMg, the processing advances to step S309. If HMg≦VMg, the processing advances to step S308. In this case, since HMg>VMg, the processing advances to step S309.

In this embodiment, the horizontal magnification rate (HMg) is employed as the magnification rate (Mg) in step S309. The fractions are rounded up so, that the magnification rate Mg=105%.

In step S104, the reading area obtained in step S103 is adjusted to decide the actual reading area. Details of this processing will be described below with reference to FIG. 7.

Figure 7:
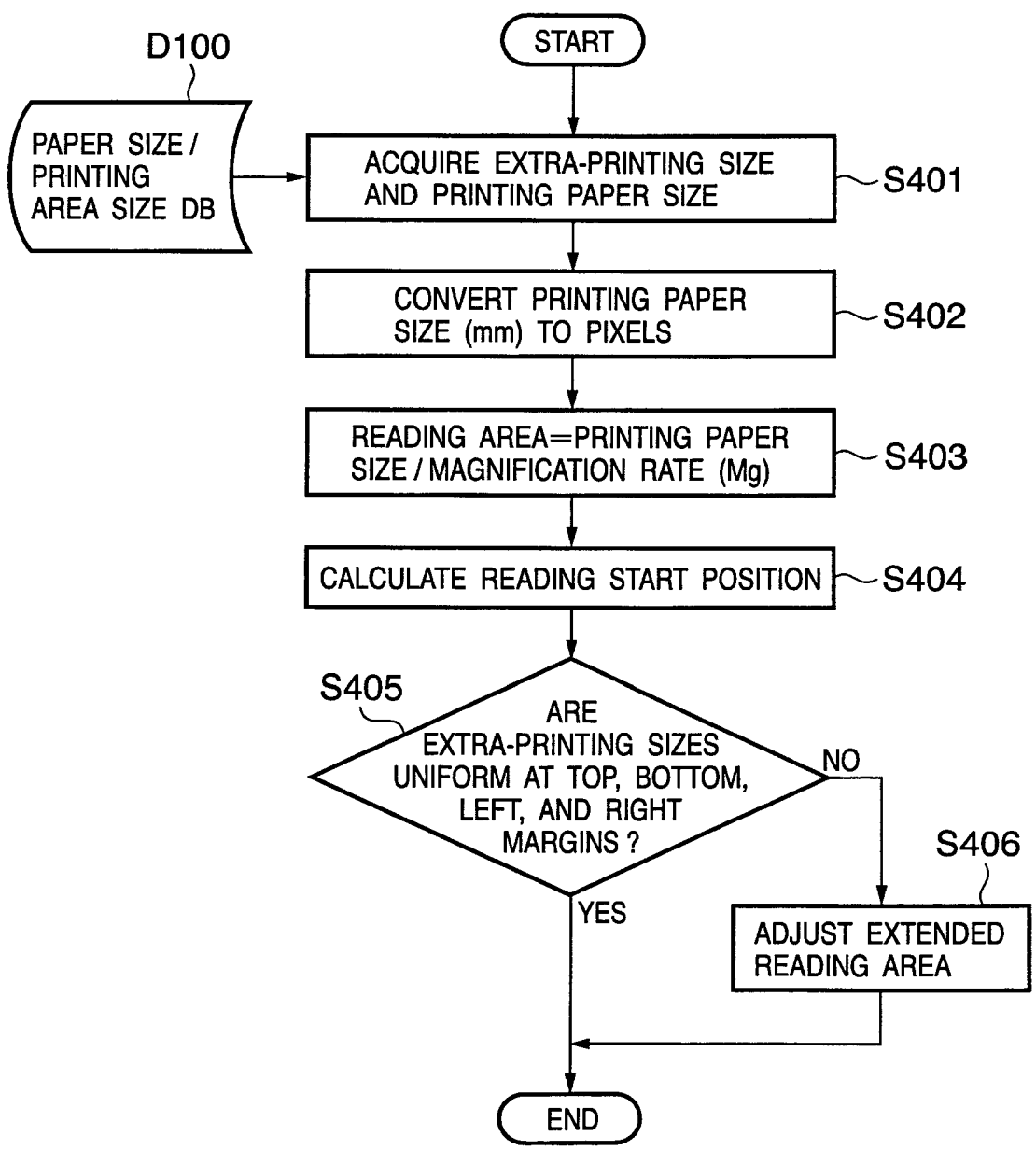
FIG. 7 is a flowchart showing details of reading area decision processing.
Figure 8:
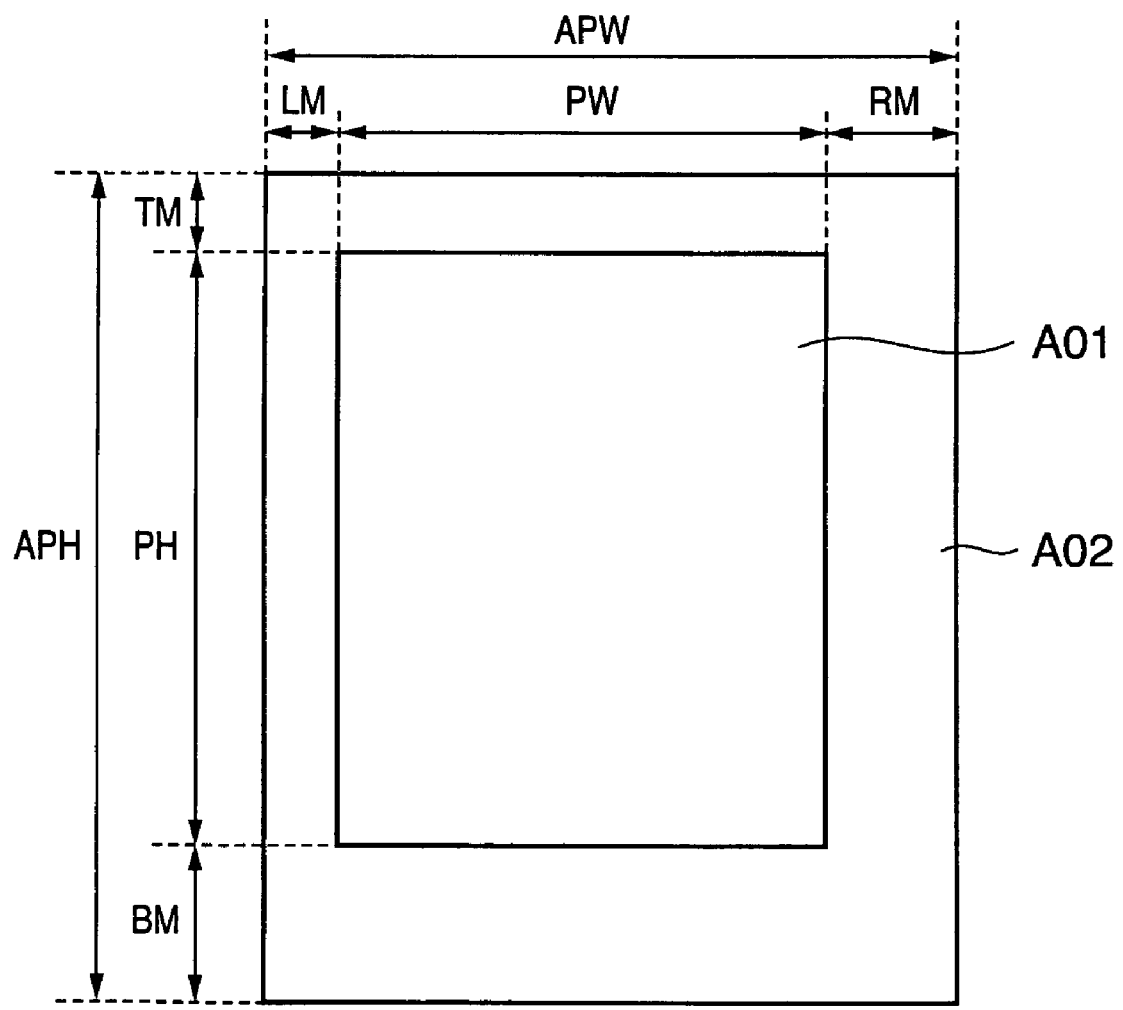
FIG. 8 is a view showing the relationship between a printing paper sheet and a printing area.

FIG. 7 is a flowchart showing details of reading area decision processing.

In this processing, the inverse of the magnification rate is added to the printing area to decide the reading area.

In step S401, the printing paper size is acquired from the printing paper size/printing area size DB. In step S402, the size is converted into pixel values.

In step S403, the inverse of the magnification rate (Mg) is multiplied with the printing area.

More specifically, 7251×100/105=6905 pixels are overwritten on the vertical reading size (IN_SizeY). Similarly, 5196×100/105=4948 pixels are overwritten on the horizontal reading size (IN_SizeX).

In step S404, adjustment is performed to align the center of the image original to the center of the copy image to be printed. This adjustment is done by offsetting the difference obtaining from superimposing the reading size on the center of the reading area candidate. Hence, the horizontal and vertical coordinate values of the reading start position (RS) are IN_OfsX=(4960−4948)/2=6, IN_OfsY=(7015−6905)/2=55. Since the extra-printing sizes are uniform at the top, bottom, left, and right margins, it is determined in step S405 that the processing ends.

The copy operation is executed on the basis of the printing area and reading area decided in the above-described processing.

The image area/size information deciding unit R02 transfers, to the data flow control unit R01, the reading area information (IN_SizeX, IN_SizeY, IN_OfsX, IN_OfsY) and magnification rate (Mg) calculated in the above-described manner. The data flow control unit R01 transfers, to the scanner engine control unit R03, the reading area information received from the image area/size information deciding unit R02 and the reading resolution information (IN_Reso=600). The data flow control unit R01 also transfers the magnification rate (Mg) to the read image processing unit R04.

Figure 9:
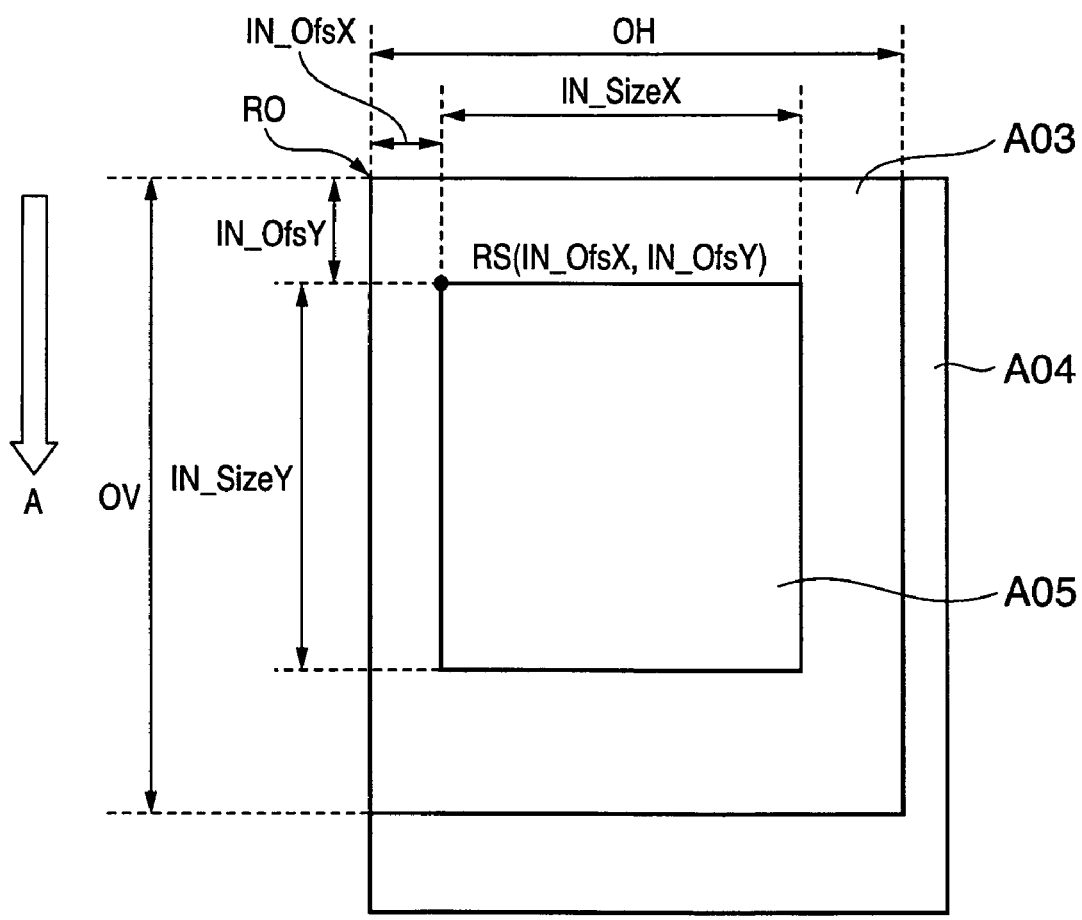
FIG. 9 is a view showing the relationship between a reading area, an original area, and the original table area of an MFP having a copy function.

The scanner engine control unit R03 moves the sensor of the reading unit 8 from the reading reference position (R0) to the vertical reading start position (IN_OfsY=55 pixels) at a high speed in the direction of the arrow A shown in FIG. 9. Then, the sensor corresponding to the horizontal reading size (IN_Size=4948) from the horizontal reading start position (IN_OfsX=6) is validated to start reading.

When the sensor has been driven in correspondence with the vertical reading size (IN_SizeY=6905) after the start of reading, the sensor is invalidated and returned to the reading reference position (R0).

The read image processing unit R04 causes the first magnification/reduction processing unit R08 to enlarge the read image at the magnification rate (Mg)=105% to generate image data having a size of 7250 pixels (vertical)×5195 pixels (horizontal), executes color processing, and stores the image data in the RAM 2.

The print image processing unit R05 stores, in the RAM 2, the image data that has undergone color processing and quantization processing. Finally, the print engine control unit R06 controls the printing unit 6 to print in the printing area by using the quantized image data.

2. Marginless and Automatic Magnification/Reduction Copy

An example will be described with reference to FIGS. 4 to 7 in which the size of an image original is automatically detected, and marginless copy is executed for an original with an arbitrary size (this operation will be referred to as automatic magnification/reduction copy). In the example, an A4 printing paper sheet (297 mm (vertical)×210 mm (horizontal)) is used, and an image original having a size of 254 mm (vertical)×25.4 mm (horizontal) is set at a position apart from the reading reference position (R0) by 25.4 mm in the vertical direction and 25.4 mm in the horizontal direction and copied.

It is also assumed that the extra-printing size is 5 mm at each of the top, bottom, left, and right margins.

Printing area decision in step S101 shown in FIG. 4 is done in the following.

In this case, the user designates, through the operation unit 4, a mode (automatic magnification/reduction mode) to print at an optimum magnification rate after image original detection. In accordance with this designation, the data flow control unit R01 transfers the following parameter values to the scanner engine control unit R03 to scan the entire original table surface at a resolution of 75 dpi without intervening the image area/size information deciding unit R02. The parameters are IN_Reso=75, IN_OfsX=0, IN_OfsY=0, IN_SizeX=0, and IN_SizeY=0.

The scanner engine control unit R03 controls the sensor of the reading unit 8 to execute the reading operation in accordance with the above parameter values. The read image data is saved in the RAM 2.

The data flow control unit R01 instructs an image data analyzing unit R16 to analyze the read image data. The image data analyzing unit R16 analyzes the position and size of the image original from the image data in accordance with the instruction. As a result of analysis, the image data analyzing unit R16 recognizes the image original size as 254 mm (vertical)×25.4 mm (horizontal). The image data analyzing unit R16 notifies the data flow control unit R01 that the image original is set at a position apart from the reading reference position (R0) by 25.4 mm in the vertical direction and 25.4 mm in the horizontal direction.

The data flow control unit R01 notifies the image area/size information deciding unit R02 of the above-described original position information and that the mode is the marginless copy mode, the printing paper size is A4, and the copy mode is the automatic magnification/reduction mode.

The image area/size information deciding unit R02 decides a vertical pixel count of 7,015 pixels and a horizontal pixel count of 4,960 pixels for the A4 printing paper sheet, as described above. Since the extra-printing size of 5 m is designated at each of the top, bottom, left, and right margins, the printing area has a size obtained by extending the A4 size by 118 pixels to the upper, lower, left, and right sides. For this reason, the printing area size is 7251 pixels (vertical)×5196 pixels (horizontal).

The processing in step S101 shown in FIG. 4 is thus ended.

In step S102, the reading area candidate is decided.

The flowchart in FIG. 5 shows details of reading area candidate decision processing. Since the automatic magnification/reduction mode is designated in this case, the processing advances to step S205 in accordance with determination in step S201.

In step S205, the image data analyzing unit R16 temporarily defines a resolution of 600 dpi, IN_SizeY=6000 pixels, and IN_SizeX=600 pixels for the reading area candidate. The coordinate values of the reading start position (RS) are temporarily defined to be IN_OfsY=600 in the vertical direction and IN_OfsX 600 in the horizontal direction.

The magnification rate (Mg) is decided in step S103.

The flowchart in FIG. 6 shows details of magnification rate decision processing.

In this case, a magnification rate is obtained such that the image data having a size of 6000 pixels (vertical)×600 pixels (horizontal) can be printed in a printing area having a size of 7,251 pixels (vertical)×5,196 pixels (horizontal) without forming any margin.

As described above, the extra-printing sizes are uniform at the top, bottom, left, and right margins. Hence, in the flowchart shown in FIG. 6, steps S301 to S303 are executed, and the processing advances to step S304, as already described in "Marginless and Normal Copy".

In step S304, the magnification rate (VMg) based on the vertical direction is obtained. In this case, the magnification rate is obtained by dividing the vertical printing area size by the vertical size of the image data. Hence, VMg=7251/6000=about 120.8%.

Similarly, in step S306, the magnification rate (HMg) based on the horizontal direction is obtained. In this case, HMg=5196/600=about 866%.

To enlarge the image without forming any margin in the printing area, a larger magnification rate is employed. In step S307, the horizontal magnification rate (HMg) is compared with the vertical magnification rate (VMg). If HMg>VMg, the processing advances to step S309. If HMg≦VMg, the processing advances to step S308. In this case, since HMg>VMg, the processing advances to step S309.

In this embodiment, the horizontal magnification rate (HMg) is employed as the magnification rate (Mg) in step S309 so that the magnification rate Mg=866%.

The magnification rate (Mg) is decided in this way.

Finally, in step S104, the reading area is decided.

The flowchart in FIG. 7 shows details of reading area decision processing.

In this case, the inverse of the magnification rate is multiplied with the printing area to obtain the reading area.

As already described in "Marginless and Normal Copy", processing in steps S401 to S403 is executed to overwrite 7251×100/866=837 pixels on the vertical reading size (IN_SizeY). Similarly, 5196×100/866=600 pixels are overwritten on the horizontal reading size (IN_SizeX).

In step S404, adjustment is performed to align the center of the image original to the center of the copy image to be printed. This adjustment is done by offsetting the difference obtained from superimposing the reading size on the center of the reading area candidate, as already described in "Marginless and Normal Copy". Hence, the horizontal and vertical coordinate values of the reading start position (RS) are IN_OfsX=600+(600−600)/2=600, IN_OfsY=600+(6000−837)/2=3181. Since the extra-printing sizes are uniform at the top, bottom, left, and right margins, it is determined in step S405 that the processing ends.

The copy operation is executed on the basis of the printing area and reading area decided in the above-described manner.

The image area/size information deciding unit R02 transfers, to the data flow control unit R01, the reading area information (IN_SizeX, IN_SizeY, IN_OfsX, IN_OfsY) and magnification rate (Mg) calculated in the above-described manner. The data flow control unit R01 transfers, to the scanner engine control unit R03, the reading area information received from the image area/size information deciding unit R02 and the reading resolution information (IN_Reso=600). The data flow control unit R01 also transfers the magnification rate (Mg) to the read image processing unit R04.

The scanner engine control unit R03 moves the sensor of the reading unit 8 from the reading reference position (R0) to the vertical reading start position (IN_OfsY=3181 pixels) at a high speed in the direction of the arrow A shown in FIG. 9. Then, the sensor corresponding to the horizontal reading size (IN_Size=600) from the horizontal reading start position (IN_OfsX=600) is validated to start reading.

When the sensor has been driven in correspondence with the vertical reading size (IN_SizeY=837) after the start of reading, the sensor is invalidated and returned to the reading reference position (R0).

The read image processing unit R04 causes the first magnification/reduction processing unit R08 to enlarge the read image at the magnification rate (Mg)=866% to generate image data having a size of 7248 pixels (vertical)×5196 pixels (horizontal), executes color processing, and stores the image data in the RAM 2.

The print image processing unit R05 stores, in the RAM 2, the image data that has undergone color processing and quantization processing. Finally, the print engine control unit R06 controls the printing unit 6 to print in the printing area by using the quantized image data.

3. Marginless and Automatic Magnification/Reduction Copy (a Case where Different Extra-Printing Sizes are Set at Top, Bottom, Left, and Right Margins)

An example will be described with reference to FIGS. 4 to 7 in which marginless copy is executed in a case where different extra-printing sizes are set at the top, bottom, left, and right margins in the automatic magnification/reduction mode. In this example, an A4 printing paper sheet (297 mm (vertical)×210 mm (horizontal)) is used, and an image original having a size of 254 mm (vertical)×25.4 mm (horizontal) is set at a position apart from the reading reference position (R0) by 25.4 mm in the vertical direction and 25.4 mm in the horizontal direction and copied.

It is assumed in this case that the extra-printing sizes at the top and bottom margins are 5 mm and 10 mm, respectively, while the extra-printing sizes at the left and right margins are 5 mm and 10 mm, respectively.

A description of the same processing as described in "Marginless and Automatic Magnification/Reduction Copy" will be omitted or briefly made. The printing paper size/printing area size DB stores the size of the A4 printing paper sheet and values obtained by adding the extra-printing sizes to the size of the A4 printing paper sheet, i.e., 312 mm (vertical) and 255 mm (horizontal).

Printing area decision in step S101 shown in FIG. 4 is done in the following.

The user designates the printing paper size and automatic magnification/reduction mode through the operation unit 4. In accordance with this designation, the same processing as described in "Marginless and Automatic Magnification/Reduction Copy" is executed. A vertical pixel count of 7,015 pixels and a horizontal pixel count of 4,960 pixels for the A4 printing paper sheet are decided. The printing area has a size obtained by extending the size of the A4 printing paper sheet on the basis of the designated extra-printing sizes at top, bottom, left, and right margins by the following values in the vertical and horizontal directions: 236 pixels to the upper side, 118 pixels to the lower side, 118 pixels to the left side, and 236 pixels to the right side. Hence, the printing area size is 7369 pixels (vertical)×5314 pixels (horizontal).

The processing in step S101 shown in FIG. 4 is thus ended.

In step S102, the reading area candidate is decided.

In this case, the same processing as described in "Marginless and Automatic Magnification/Reduction Copy" is executed. More specifically, in accordance with the flowchart shown in FIG. 5, a resolution of 600 dpi, IN_SizeY=6000 pixels, and IN_SizeX=600 pixels are temporarily defined for the reading area candidate. The coordinate values of the reading start position (RS) are temporarily defined to be IN_OfsY=600 in the vertical direction and IN_OfsX=600 in the horizontal direction.

The magnification rate (Mg) is decided in step S103.

In this case, a magnification rate is obtained such that the image data having a size of 6000 pixels (vertical)×600 pixels (horizontal) can be printed in a printing area having a size of 7,369 pixels (vertical)×5,314 pixels (horizontal) without forming any margin.

The flowchart in FIG. 6 shows details of magnification rate decision processing. According to this flowchart, since different extra-printing sizes are set at the top, bottom, left, and right margins, the processing advances from step S303 to step S305.

In step S305, to equalize the extra-printing sizes in the vertical direction or horizontal direction, the printing area size is extended by 118 pixels to the upper side and 118 pixels to the left side, thereby obtaining a printing area of 7487 pixels (vertical)×5432 pixels (horizontal). That is, the target size of the image data enlarged by automatic magnification/reduction is set to 7487 pixels (vertical)×5432 pixels (horizontal).

In step S304, the magnification rate (VMg) based on the vertical direction is obtained. VMg=7487/6000=about 124.8%.

Similarly, in step S306, the magnification rate (HMg) based on the horizontal direction is obtained. In this case, HMg=5432/600=about 905.3%.

To enlarge the image without forming any margin in the printing area, a larger magnification rate is employed. In step S307, the horizontal magnification rate (HMg) is compared with the vertical magnification rate (VMg). If HMg>VMg, the processing advances to step S309. If HMg≦VMg, the processing advances to step S308. In this case, since HMg>VMg, the processing advances to step S309.

In this embodiment, the horizontal magnification rate (HMg) is employed as the magnification rate (Mg) in step S309 so that the magnification rate Mg=905.3%.

The magnification rate (Mg) is decided in this way.

Finally, in step S104, the reading area is decided.

The flowchart in FIG. 7 shows details of reading area decision processing.

In this case, the inverse of the magnification rate is multiplied with the printing area to obtain the reading area.

As already described in "Marginless and Normal Copy", processing in steps S401 to S403 is executed to overwrite 7487×100/905.3=827 pixels on the vertical reading size (IN_SizeY). Similarly, 5432×100/905.3=600 pixels are overwritten on the horizontal reading size (IN_SizeX).

In step S404, to align the center of the image original to the center of the copy image to be printed, the difference obtained from superimposing the reading size on the center of the reading area candidate is offset. Hence, the horizontal and vertical coordinate values of the reading start position (RS) are IN_OfsX=600+(600−600)/2=600, IN_OfsY=600+(6000−827)/2=3186.

The area is reduced by a value obtained by multiplying the inverse of the magnification rate (Mg) with the extended values in step S305. In this case, the extra-printing sizes are different at the top, bottom, left, and right margins. Hence, the processing advances to step S406 in accordance with determination in step S405.

In step S406, the image data size extended in step S305 is returned to the original size. A value obtained by multiplying the inverse of the magnification rate (Mg) with the extended size is 118×100/905.3%=13 pixels with respect to the upper and left sides.

When this value is adjusted, IN_SizeX=600−13=587 pixels, and IN_SizeY=827−13=814 pixels. Since the printing area is extended to the left side by 118 pixels, IN_OfsX=600+118=718 pixels. In the portion where the printing area is extended to the lower side by 118 pixels, the reading start position need not be adjusted. Only the reading stop position in the vertical direction is adjusted. Hence, IN_OfsY does not change. If the printing area is extended to the upper side by 118 pixels, IN_OfsY=3186+118=3304 pixels. If the printing area is extended to the right and left sides by 118 pixels, IN_OfsX need not be adjusted, and only IN_SizeY is adjusted.

The copy operation is executed on the basis of the printing area and reading area decided in the above-described manner.

The image area/size information deciding unit R02 transfers, to the data flow control unit R01, the reading area information (IN_SizeX, IN_SizeY, IN_OfsX, IN_OfsY) and magnification rate (Mg) calculated in the above-described manner. The data flow control unit R01 transfers, to the scanner engine control unit R03, the reading area information received from the image area/size information deciding unit R02 and the reading resolution information (IN_Reso=600). The data flow control unit R01 also transfers the magnification rate (Mg) to the read image processing unit R04.

The scanner engine control unit R03 moves the sensor of the reading unit 8 from the reading reference position (R0) to the vertical reading start position (IN_OfsY=3186 pixels) at a high speed in the direction of the arrow A shown in FIG. 9. Then, the sensor corresponding to the horizontal reading size (IN_Size=578) from the horizontal reading start position (IN_OfsX=718) is validated to start reading.

When the sensor has been driven in correspondence with the vertical reading size (IN_SizeY=814) after the start of reading, the sensor is invalidated and returned to the reading reference position (R0).

The read image processing unit R04 causes the first magnification/reduction processing unit R08 to enlarge the read image at the magnification rate (Mg)=905.3% to generate image data having a size of 7369 pixels (vertical)×5314 pixels (horizontal), executes color processing, and stores the image data in the RAM 2.

The print image processing unit R05 stores, in the RAM 2, the image data that has undergone color processing and quantization processing. Finally, the print engine control unit R06 controls the printing unit 6 to print in the printing area by using the quantized image data.

In the above-described processing, upon obtaining the reading area considering the extra-printing sizes, the extended target area is obtained after the printing area is temporarily extended. However, a margin may be obtained in advance.

According to the above-described embodiment, in various kinds of marginless copy modes, control is done such that the reading start position of an image original is automatically decided, the sensor is moved to that position, and an image in an area necessary for image printing is read.

Since no image reading is executed for an area that requires no actual printing, the copy operation can be speeded up. In addition, the capacity of the memory to store image data obtained by image reading can be reduced. This contributes to cost reduction of the apparatus.

Since the center of the image original is automatically aligned to the center of the copy image to be printed, a marginless copy image with a natural impression can be obtained.

In the above-described processing, the image printed in an actual printing area is slightly small due to calculation errors. This part falls outside the printing paper sheet and poses no problem. However, if accuracy on the order of one pixel is required, the calculation accuracy may be increased. Image data may be cut off after it is extended by a rate higher than the obtained magnification rate (Mg).

The enlargement processing in the above-described embodiment is executed by the first magnification/reduction processing unit R08. However, instead of the first magnification/reduction processing unit R08, the second magnification/reduction processing unit R10 or third magnification/reduction processing unit R12 may execute the processing.

In the above-described embodiment, it is assumed that the printing paper size is A4. However, present invention can effectively be applied to a printing paper sheet of any size.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Application No. 2005-232300, filed Aug. 10, 2005, which is hereby incorporated by reference herein in its entirety.

What is claimed is:

1. An image printing apparatus which includes reading means for reading an image original by scanning a sensor, and printing means for printing on a print medium on the basis of image data of an image read by said reading means and is capable of copying the image, comprising:
    marginless copy instruction means for instructing marginless copy;
    size instruction means for instructing a size of the print medium;
    detection means for detecting a size of an original placed on an original table of said reading means;
    first decision means for deciding a reading area having a reading start position and a reading size on the original table on the basis of the instructions by said marginless copy instruction means and said size instruction means, a detection result by said detection means, and a predefined extra-printing size; and
    reading control means for controlling said reading means to execute image reading while limiting an operation range of the sensor in accordance with the reading start position and the reading size so that the image of the image original is read from the reading area decided by said first decision means.

2. The apparatus according to claim 1, further comprising:
    second decision means for deciding, in accordance with the instructions by said marginless copy instruction means and said size instruction means, a size of the image to be printed by said printing means for printing on the print medium; and
    print control means for controlling said printing means to print the image having the size decided by said second decision means on the print medium on the basis of the image data of the image read under the control of said reading control means.

3. The apparatus according to claim 1, wherein the marginless copy instructed by said marginless copy instruction means includes an automatic magnification/reduction copy mode.

4. The apparatus according to claim 3, wherein said detection means includes automatic detection means for, when the automatic magnification/reduction copy is instructed, automatically detecting a position and a size of the original placed on the original table by operating said reading means and causing the sensor to scan at a resolution lower than that for actual image reading.

5. The apparatus according to claim 4, further comprising automatic magnification rate decision means for automatically deciding a magnification rate of the image read by said reading means on the basis of the position and the size of the original detected by said automatic detection means, the size of the print medium instructed by said size instruction means, and the predefined extra-printing size.

6. The apparatus according to claim 5, wherein the predefined extra-printing size is set at each of top, bottom, left, and right margins of the print medium.

7. The apparatus according to claim 6, further comprising automatic offset means for, when the predefined extra-printing size is not uniform at the top, bottom, left, and right margins of the print medium, automatically offsetting a reading range of the image to align a center of the image original to a center of the image to be printed on the print medium.

8. The apparatus according to claim 1, further comprising enlargement/reduction means for enlarging/reducing the image data of the image read by said reading means.

9. The apparatus according to claim 1, wherein said reading control means controls to move the sensor at a high speed to the reading area decided by said first decision means.

10. The apparatus according to any of claims 1 to 9, wherein said printing means prints on the print medium by an inkjet printhead.

11. A method of controlling an image printing apparatus which includes reading means for reading an image original by scanning a sensor, and printing means for printing on a print medium on the basis of image data of an image read by the reading means and is capable of copying the image, comprising steps of:
    instructing a marginless copy;
    instructing a size of the print medium;
    detecting a size of an original placed on an original table of the reading means;
    deciding a reading area having a reading start position and a reading size on the original table on the basis of the instructions at said steps of instructing, a detection result at said step of detecting, and a predefined extra-printing size; and
    controlling the reading means to execute image reading while limiting an operation range of the sensor in accordance with the reading start position and the reading size so that the image of the image original is read from the reading area decided at said step of deciding.

* * * * *